United States Patent
Belling et al.

(10) Patent No.: US 7,359,390 B2
(45) Date of Patent: Apr. 15, 2008

(54) ARRANGEMENT FOR CONNECTING AN OPTICAL WAVEGUIDE TO A MICROPROCESSOR-CONTROLLED ELECTRICAL APPLIANCE

(75) Inventors: Thomas Belling, München (DE); Peter Leis, Penzberg (DE); Bernhard Pfeil, München (DE); Georg Schmitt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/520,526

(22) PCT Filed: Jul. 3, 2003

(86) PCT No.: PCT/DE03/02223

§ 371 (c)(1),
(2), (4) Date: Jan. 7, 2005

(87) PCT Pub. No.: WO2004/006597

PCT Pub. Date: Jan. 15, 2004

(65) Prior Publication Data

US 2006/0039644 A1    Feb. 23, 2006

(30) Foreign Application Priority Data

Jul. 9, 2002    (DE) .................. 102 31 027

(51) Int. Cl.
*H04L 12/56*    (2006.01)
*G06F 15/16*    (2006.01)
*G02B 6/28*    (2006.01)

(52) U.S. Cl. ............... 370/401; 370/400; 709/232; 709/238; 385/24

(58) Field of Classification Search .............. 385/14, 385/129, 130, 131, 88, 89, 24, 15, 31; 709/238, 709/232; 370/395.2, 395.3, 400, 401
See application file for complete search history.

(56) References Cited

U.S. PATENT DOCUMENTS

| | | | | |
|---|---|---|---|---|
| 5,818,428 A | * | 10/1998 | Eisenbrandt et al. | 345/173 |
| 6,071,015 A | * | 6/2000 | Erbse et al. | 385/88 |
| 6,446,192 B1 | * | 9/2002 | Narasimhan et al. | 712/29 |
| 6,671,367 B1 | * | 12/2003 | Graf et al. | 379/229 |
| 6,744,768 B2 | * | 6/2004 | Vikberg et al. | 370/395.21 |
| 2002/0009920 A1 | * | 1/2002 | Wijma et al. | 439/502 |
| 2002/0080797 A1 | | 6/2002 | Kim | 370/395.5 |
| 2003/0169751 A1 | * | 9/2003 | Pulkka et al. | 370/401 |
| 2003/0195981 A1 | * | 10/2003 | Graf et al. | 709/238 |
| 2006/0153205 A1 | * | 7/2006 | Belling et al. | 370/401 |

FOREIGN PATENT DOCUMENTS

| | | | |
|---|---|---|---|
| EP | 1182840 A1 | 2/2002 | ....... 385/12 X |
| WO | WO-02/41574 A2 | 5/2002 | ....... 385/12 X |
| WO | WO-02/51092 A2 | 6/2002 | ....... 385/12 X |
| WO | WO-02/052811 A1 | 7/2002 | ....... 385/12 X |

* cited by examiner

*Primary Examiner*—Brian M. Healy
(74) *Attorney, Agent, or Firm*—Bell, Boyd & Lloyd LLP

(57) ABSTRACT

The invention relates to an arrangement for connecting an optical waveguide to a microprocessor-controlled electrical appliance having an arithmetic module which is connected to the electrical appliance and has network functionalities for linking the electrical appliance to a network, an interface chip, connected to the arithmetic module, in the form of an integrated circuit chip, and an optical transmission and reception chip which is connected firstly to the interface chip and secondly to the optical waveguide. In order to make such an arrangement particularly efficient, provision is made for the interface chip to have integrated functional modules which provide at least some of the network functionalities.

19 Claims, 1 Drawing Sheet

US 7,359,390 B2

ARRANGEMENT FOR CONNECTING AN OPTICAL WAVEGUIDE TO A MICROPROCESSOR-CONTROLLED ELECTRICAL APPLIANCE

CLAIM FOR PRIORITY

This application is a national stage of PCT/DE2003/002223, published in the German language on Jan. 15, 2004, and which claims the benefit of priority to German Application No. DE 102 31 027.0, filed on Jul. 9, 2002.

TECHNICAL FIELD OF THE INVENTION

The invention relates to a method and devices for signaling a modification of the coding of a user data connection section termination at a media gateway from a media gateway controller to the media gateway.

BACKGROUND OF THE INVENTION

In ITU-T protocols H.248 and Q.1950 the control of so-called media gateways (MGWs=switching devices in particular in a cellular mobile radio network or fixed network) is specified by so-called media gateway controllers (MGCs). The protocol Q.1950 is used in conjunction with the BICC protocol Q.1902.4 also specified by the ITU-T. These protocols can also be used for 3GPP applications. Media gateways for example connect user connection sections (for the transmission of user data such as voice, text, multimedia) of a telecommunication network and in some instances convert different codings, e.g. voice codings such as G.711 or AMR, to each other. User connection section termination, abbreviated to termination, refers below to the termination of a section of a user connection switched through the MGW, e.g. for voice or multimedia (sound and image) at this MGW. The MGW sends and/or receives (user) data associated with the user connection through said termination. In the parlance of the protocols H.248 and Q.1950 a so-called termination corresponds to a user connection section termination.

The above-mentioned protocols allow existing user connections to be modified, e.g. by selecting a different coding. The signaling thereby used between MGC and MGW (protocols H.248 and Q.1950) is such that each termination into the MGW is modified irrespective of the other terminations connected to it within the MGW. For example the MGW can be instructed to use a different coding at this termination or to send and/or receive no data. When a termination is modified, the MGW does not know whether other connections also connected by it to said termination will also be modified later. Therefore when a termination is modified the MGW must immediately implement measures if different codings result in connected terminations (in the parlance of the protocols H.248 and Q.1950 interconnected terminations are located within an MGW in a so-called common context) and these are converted to each other for example by so-called transcoding. In specific cases however the coding of all terminations interconnected into the MGW, which are in the same context, should be modified almost simultaneously, for example in the context of the so-called BICC codec modification or codec renegotiation (see Q.1902.4), by means of which the coding of existing voice connections can be modified. The 3GPP also uses the said BICC procedures to switch existing user connections between voice and multimedia (i.e. a combination of voice and image in a common coding). The MGC can identify such situations based on the so-called call control signaling coming into it, e.g. Q.1902.4. As the signaling of the MGC to the MGW is sequential, in the event of almost simultaneous switching of all connected terminations within an MGW a possibly unwanted response results. The MGW briefly activates a transcoder, which is then almost immediately deactivated again. This generates an unnecessary workload in an MGW and reduces its throughput. It would be acceptable but has hitherto not been technically possible to break the connection for a short time. When the first termination is modified, the MGW may also determine that it cannot convert the new coding of this termination into the coding still used at the other termination(s). This can happen for example when switching between a voice connection and a multimedia connection or a general data connection. In this case the MGW therefore rejects the modification of the user connection via H.248/Q.1950 signaling.

SUMMARY OF THE INVENTION

The present invention enables the most efficient possible switching of codings in terminations at a media gateway on the instruction of a media gateway controller and to enable switching between codings, which the media gateway cannot convert to each other. The object is achieved respectively by the subject matter of the independent Claims. According to the invention an unnecessary workload due to the brief powering up and powering down of a transcoder into the MGW can be avoided in that the media gateway controller instructs the media gateway by appropriate signaling only to implement a verification of the connectability of terminations after receipt of a plurality of instructions to modify the coding of a termination (and in some instances receipt of a specific instruction to start a comparison) (because the powering up of a transcoder would only take place after a comparison showing that the terminations to be connected or which have already been connected during a coding modification no longer use the same coding, which is not the case here).

Switching between user connections, for which the MGW does not support transcoding, is enabled. This for example enables switching between user connections for voice and multimedia. The following embodiments, which are not limiting but rather exemplary, are particularly advantageous:

1. In the H.248/Q.1950 protocols in the case of signaling for the modification of a termination one or a plurality of voice element(s) is/are also used, with which the MGC instructs the MGW only to verify whether it can connect the terminations to each other in their new coding, after receipt of instructions to modify a plurality of terminations connected within the MGW.

2. In a preferred embodiment of 1 the MGW does not forward user data from and to the relevant terminations, once it has received an instruction to modify for said termination. After the verification specified in 1, the MGW restores the connection between the relevant terminations.

3. In a preferred embodiment of 1 and 2 the MGW cannot isolate the relevant termination immediately after receipt of the instruction from the MGC to modify but must wait until switching of the coding is prompted by means of a subsequent separate signaling with the (MGW) switching node at the other end of the user connection section. This breaks the user connection for a quite short period.

4. In a preferred embodiment of 1 to 3 the MGW cannot restore the connections immediately after the verification specified in 1 but must wait until switching of the coding at said terminations has also been prompted by means of separate signaling with the (MGW) switching node at the other ends of the user connection sections to be reconnected.

5. In a preferred embodiment of 1 and 2 the MGW can reconnect the originally connected terminations in their old coding, if the MGW determines during the verification specified in 1 that it cannot connect the terminations together in their new coding. The MGW can also signal this error to the MGC.

6. In a preferred embodiment of 5 the MGW can transmit the corresponding error message to the MGC as a response to the instruction to modify the last termination. The MGC is then able to utilize mechanisms already existing in BICC, Q.1902.4 and Q.1950 to reject the modification of the user connections.

7. In a preferred embodiment of 1 and 2 an extension of the existing instructions to modify a termination is used as the voice element.

8. In a preferred embodiment of 7 this extension should be contained in the first corresponding instruction for a termination. Only after the arrival of the last corresponding instruction for a connected termination should the MGW verify whether it can connect the terminations together in their new coding. This solution is easily inserted into the existing BICC message flows. No additional messages are required, just new voice elements within existing messages.

9. In a preferred embodiment of 8 the newly inserted voice element can be included in all instructions to modify originally connected terminations. This simplifies the task of the MGC and the MGW.

10. As an alternative to 8, in a preferred embodiment of 7 an extension can be included in the first instruction and also optionally in further instructions to modify connected terminations. This extension instructs the MGW not to implement a verification according to 1 until an instruction is received with an additional extension. This additional extension instructs the MGW to implement the verification according to 1.

11. In a preferred embodiment of 7 the newly inserted voice element can be a characteristic of the so-called H.248 context.

12. As an alternative to 11 in a preferred embodiment of 7 the newly inserted voice element can be a characteristic of the so-called H.248 termination.

13. As an alternative to 7 in a preferred embodiment of 1 and 2 the MGC can isolate a termination by a specific instruction, before the MGC modifies the coding at said termination. Once the MGC has also modified the coding at one or a plurality of other originally connected terminations, the MGC can reconnect the isolated termination by a further specific instruction.

14. In a preferred embodiment of 13 the MGC can isolate a termination by moving it into another so-called H.248 context.

15. In a preferred embodiment of 13 and 14 the MGC can use the so-called Q.1950 instructions "Isolate" and "Join".

BRIEF DESCRIPTION OF THE DRAWINGS

Further features and advantages of the invention will emerge from the Claims and subsequent description of an exemplary embodiment with reference to the drawing, in which:

DETAILED DESCRIPTION OF THE INVENTION

Figure 1:
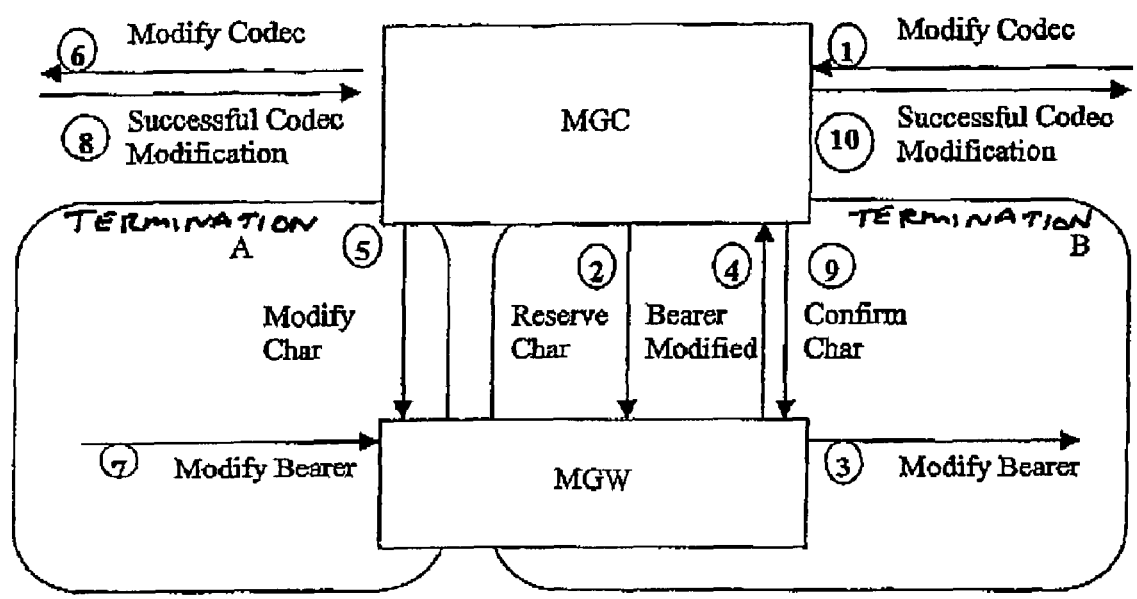
FIG. 1 shows as an example the BICC message flow in the event of the inventive switching of a user connection from one coding to another coding.

In FIG. 1 the numerals indicate the time sequence of the messages they designate. Messages within the borders of the elements "Termination A" and "Termination B" relate respectively to messages from the MGC to the MGW, which relate to the corresponding termination, in particular the coding to be modified of the corresponding termination. The messages 2, 3, 4, 5, 7 and 9 are respectively confirmed by a message following immediately in the reverse direction (not shown for purposes of clarity).

The MGW is a media gateway, i.e. a switching device in a telecommunication network, and can be connected to one or a plurality of further MGWs in a packet and/or line switched manner for the transmission of user data (voice, text, multimedia) and/or signaling data (3, 7).

The MGC is a controller which controls the MGW (MGC=media gateway controller) and can be connected to one or a plurality of further MGCs for sending and receiving signaling data (1, 6, 8, 10).

The terminations "Termination A" and "Termination B" (=user connection section terminations) are terminations of a section of a user connection switched through the MGW, e.g. for voice or multimedia (sound and image) at the MGW. The MGW sends and/or receives (user) data associated with the user connection through this termination to/from other MGWs. User data therefore arrives and/or user data is sent respectively via the terminations "Termination A" and "Termination B".

In the present instance the MGC receives the instruction 1 (Modify codec) to modify the codec (e.g. voice codec) used for a user connection. The MGC knows that this user connection is switched by the MGW via the terminations "Termination A" and "Termination B" in FIG. 1 and that it must therefore instruct the MGW to modify these terminations. The MGC then uses the messages 2 (Q.1950 "Reserve characteristics") and 5 (Q.1950 "Modify characteristics") with new voice elements for this purpose.

On receipt of the instruction 1 the MGC sends the message 2 "Reserve characteristics" to the MGW. This message 2 contains an instruction from the media gateway controller MGC to the media gateway MGW to modify the characteristics of a "Termination B" connected to the media gateway. On receipt of the message 2 the MGW sends a message 3 "Modify bearer", where necessary via the connection of the "Termination B" to another MGW, prompting this other MGW to modify locally the characteristics of the bearer of the user connection section to the "Termination B", e.g. the bandwidth. The MGW then confirms successful completion to the MGC by means of the "Bearer modified" message 4.

On receipt of the instruction 4 the MGC also sends the MGW the message 5 "Modify characteristics". This message 5 contains an instruction from the media gateway controller MGC to the media gateway MGW to modify characteristics (specifically the coding here) of a "Termination A" connected to the media gateway. The MGW also receives a message 7 "Modify bearer" here via the connection of the "Termination A" from another MGW, as this other MGW was informed of the planned modification of the coding for the connection of the "Termination B" via the signaling 6 to the MGC via an MGC/MGW (not shown). In some instances the MGC receives a message 8 "Successful codec modification" from another MGC (not shown) relating to a successful codec modification in the other MGC.

The message 9 "Confirm characteristics" is used by the MGC to confirm to the MGW that it should retain the new characteristics (codecs).

The MGC uses the message 10 "Successful codec modification" in relation to a successful code modification in the MGW shown to confirm to another MGC (not shown) that a successful codec modification has taken place (in the MGW shown).

According to the invention the described message flow can be used and/or modified as follows. Three alternative methods a) to c) are described:

a) Method according to points 1 to 9 and 11 and 12 above: The MGC instructs the MGW in the message 2 by means of a new voice element only to implement a verification in respect of necessary transcoding after receipt of instructions for all connected terminations (here messages 2 and 5) and if necessary to insert a transcoder. On dispatch of the message 3 the MGW isolates the termination B, so no user data can initially be transmitted via the termination B. On receipt of the message 5 the MGW determines that instructions have now been received for all terminations. The MGW then verifies whether connection of the terminations A and B is possible in the new coding. If this is not possible, the MGW sends a corresponding error message in the confirmation of receipt in relation to 5. Further error signaling is not shown here. Otherwise the MGW reconnects the terminations A and B using the new coding after receipt of the message 7.

b) Method according to points 1 to 7 and 10 to 12 above: The MGC instructs the MGW in the message 2 by means of a new voice element only to implement a verification in respect of necessary transcoding after receipt of a correspondingly marked instruction for a connected termination and if necessary to insert a transcoder. On dispatch of the message 3 the MGW isolates the termination B, so initially no user data can be transmitted via the termination B. In the message 5 the MGC instructs the MGW by means of a further new voice element to implement the specified verification. The MGW then verifies whether connection of the terminations A and B is possible in the new coding. If this is not possible, the MGW sends a corresponding error message in the confirmation of receipt in relation to 5. Further error signaling is not shown here. Otherwise the MGW reconnects the terminations A and B using the new coding after receipt of the message 7.

c) Method according to points 1 to 6 and 13 to 15 above: The MGC instructs the MGW immediately before dispatch of the message 2 by means of the additional message "Isolate" (not shown) to isolate the termination B. The MGE then forwards no user data to the termination B and also receives no user data from there. On receipt of the message 2, the MGW does not verify whether transcoding is necessary to the termination A, as the two terminations are not connected. On receipt of the confirmation of the message 5 and before dispatch of the message 6, the MGC instructs the MGW by means of the additional message "Join" (not shown) to connect the termination B to the termination A. The MGW then verifies whether connection of terminations A and B is possible in the new coding. If this is not possible, the MGW sends a corresponding error message in the confirmation of receipt in relation to 5. Further error signaling is not shown here. Otherwise the MGW reconnects the terminations A and B using the new coding after receipt of the message 7. As an alternative to the above, the additional messages "Isolate" and "Join" can also relate to the termination A.

The invention claimed is:

1. A method for signaling an instruction to modify coding of a user data connection section termination of a media gateway from a media gateway controller to the media gateway, comprising signaling an instruction from the media gateway controller to the media gateway that verification of the connectability of terminations is implemented after receipt of a plurality of instructions to modify the coding of at least one termination.

2. The method according to claim 1, where the media gateway no longer transmits user data from and to a relevant termination once it has received a modification instruction for this termination, until the specified verification of the connectability of terminations has taken place.

3. The method according to claim 1, wherein the media gateway receives an instruction from the media gateway controller to hold the verification of the connectability of terminations until the media gateway receives at least one instruction from the media gateway controller to modify the coding of another connected termination.

4. The method according to claim 1, wherein the media gateway starts the verification when it has received instructions for the connected terminations to modify the terminations.

5. The method according to claim 1, wherein the media gateway starts the verification when it receives an instruction to start the verification of the connectability of terminations.

6. The method according to claim 1, wherein the instruction to hold the verification of the connectability of terminations is signaled to the media gateway in a message, in which the media gateway is informed that it should modify the coding for at least one termination at the media gateway.

7. The method according to claim 1, wherein the MGW does not isolate the relevant termination immediately after receipt of the modification instruction from the MGC but waits until switching of the coding is prompted via a subsequent separate signaling with the switching node at the other end of the user connection section.

8. The method according to claim 1, wherein the MGW does not restore the connections immediately after the verification but waits until switching of the coding at the terminations has also been prompted via separate signaling with the switching node at the other ends of the user connection sections to be reconnected.

9. The method according to claim 1, wherein the MGW reconnects the originally connected terminations in their old coding, if the MGW determines during the verification that it cannot connect the terminations to each other in their new coding.

10. The method according to claim 1, wherein the MGW transmits an error message to the MGC in response to the instruction to modify the last termination and the MGC then uses mechanisms existing in BICC, Q.1902.4, to reject the modification of the user connections.

11. The method according to claim 1, wherein an extension of existing instructions to modify a termination is used as the voice element for an instruction to hold the verification.

12. The method according to claim 10, wherein the voice element is a characteristic of the so-called H.248 context.

13. The method according to claim 10, wherein the voice element is a characteristic of the so-called H.248 termination.

14. The method according to claim 10, wherein the MGC isolates a termination by means of a specific instruction, before the MGC modifies the coding at said termination and after the MGC has also modified the coding at one or a plurality of other originally connected terminations, the MGC reconnects the isolated termination by means of a further specific instruction.

15. The method according to claim 10, wherein the MGC isolates a termination by moving it to another so-called H.248 context.

16. The method according to claim 10, wherein the MGC uses the so-called Q.1950 instructions "Isolate" and "Join".

17. The method according to claim 10, wherein a termination is a termination of a user data connection section of the telecommunication network, which ends at the media gateway.

18. A device for signaling an instruction to modify coding of a user data connection section termination of a media gateway from a media gateway controller to the media gateway, with an instruction being signaled from the media gateway controller to the media gateway that verification of the connectability of terminations is implemented after receipt of a plurality of instructions to modify the coding of at least one termination.

19. A method for signaling an instruction to modify coding of a user data connection section termination of a media gateway from a media gateway controller to the media gateway, comprising signaling an instruction from the media gateway controller to the media gateway that verification of the connectability of terminations is implemented after receipt of a plurality of instructions to modify the coding of at least one termination, wherein the media gateway no longer transmits user data from and to a relevant termination once it has received a modification instruction for this termination, until the specified verification of the connectability of terminations has taken place.

* * * * *